US006818268B2

(12) United States Patent
Gonzalez

(10) Patent No.: US 6,818,268 B2
(45) Date of Patent: Nov. 16, 2004

(54) TRANSPARENT ARMOR STRUCTURE

(75) Inventor: Rene' G. Gonzalez, Southfield, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/672,742

(22) Filed: Sep. 29, 2003

(65) Prior Publication Data

US 2004/0058125 A1 Mar. 25, 2004

Related U.S. Application Data

(63) Continuation-in-part of application No. 10/117,556, filed on Apr. 3, 2002, now abandoned.

(51) Int. Cl.[7] .............................. E06B 3/24; B60J 1/02; F41H 5/00

(52) U.S. Cl. ................... 428/34; 296/96.14; 296/96.21; 89/36.01; 89/36.04; 52/17 L; 52/786.1; 52/786.12; 52/786.13

(58) Field of Search .......................... 428/34, 410, 911; 296/96.14, 96.21; 52/172, 786.1, 786.12, 786.13; 89/36.01, 36.04, 36.05; 109/49.5, 58.5

(56) References Cited

U.S. PATENT DOCUMENTS 4,625,659 A * 12/1986 Saelzer ...................... 109/49.5
5,002,820 A * 3/1991 Bolton et al. ............... 428/215
6,333,085 B1 * 12/2001 Emek .......................... 428/34

* cited by examiner

*Primary Examiner*—Donald J. Loney
(74) *Attorney, Agent, or Firm*—David L. Kuhn; Gail S. Soderling; Luis M. Acosta

(57) ABSTRACT

An improved transparent armor structure for use in a vehicle includes a first sheet of transparent armor composite comprising at least one layer of polymeric material and at least one layer of tempered silica glass bonded to form a laminated bullet resisting structure and also having a bracket member adapted to hold a second transparent spall resisting layer parallel to and slightly spaced from the inner surface of the first transparent composite layer. A spacing means between the first and second layers forms a chamber between the first and second panels and a desiccant is located within the chamber to minimize the amount of condensation on the surface of the transparent armor surfaces.

6 Claims, 1 Drawing Sheet

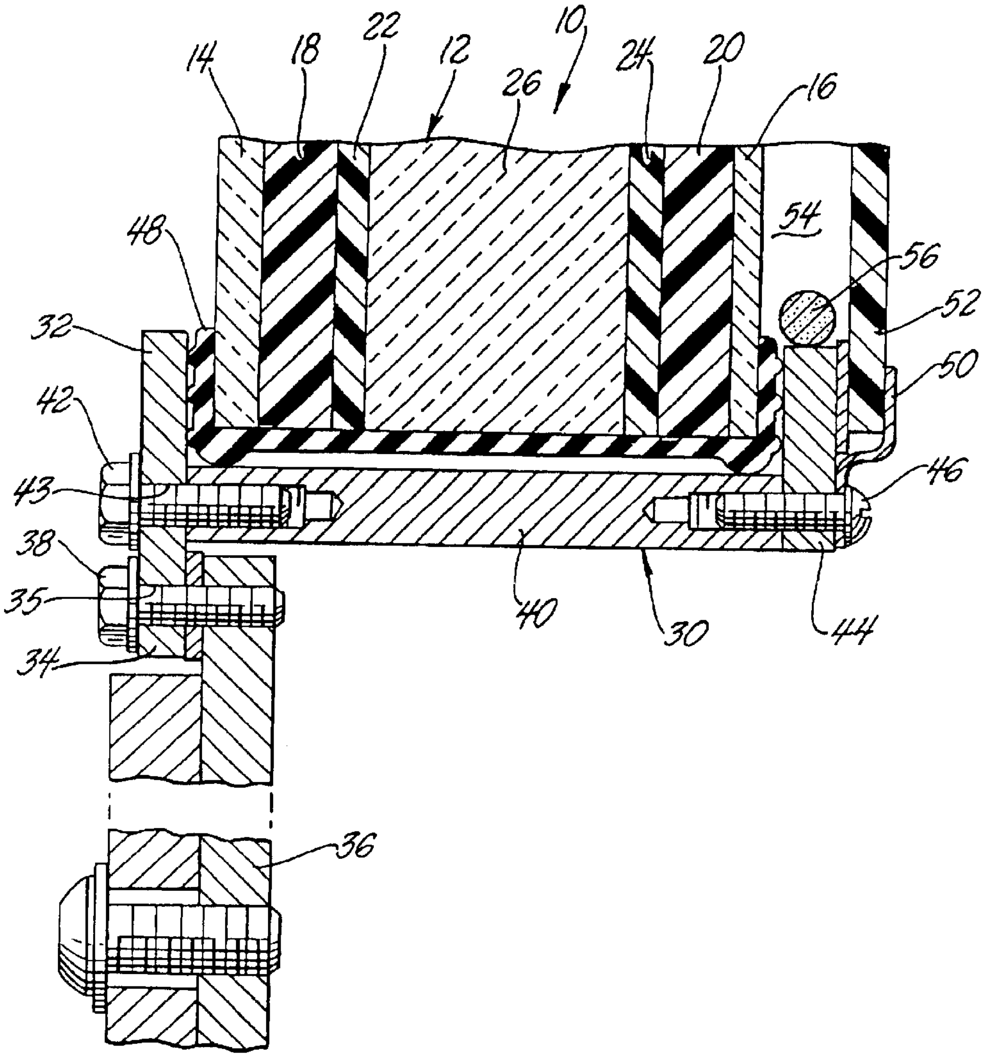
14
18
22
12
26
10
24
20
16
54
56
52
50
48
32
42
43
46
38
35
40
30
44
34
36

TRANSPARENT ARMOR STRUCTURE

CROSS REFERENCE TO RELATED APPLICATIONS

This application is a continuation in part of application Ser. No. 10/117,556, filed Apr. 3, 2002, now abandoned.

GOVERNMENT INTEREST

The invention described here may be made, used and licensed by and for governmental purposes without paying me any royalty.

BACKGROUND OF THE INVENTION

1. Field of the Invention

In one aspect this invention relates to armored vehicles. In a further aspect this invention relates to a transparent armor structure useful in military and security vehicles. In yet a further aspect, this invention relates to architectural structures for security purposes.

2. Prior Art

Security has become increasingly important. With respective to vehicle structures in general, military vehicles require greater than average protection for the occupants. This has given rise to various transparent armor structures for windshields and side windows that are designed to resist the incursion of small arms projectiles and shrapnel. This work has been ongoing for many years. In constructing transparent armor, "bullet proof glass", sandwiches made from tempered glass, and plastic layers are bonded together to form complex laminated composites all the. The resulting composites must be transparent and free of optical distortion while maximizing the ballistic protection from penetrators. In use, the inner and out of layers of the composite will be subjected to shock, scratching, abrasion and adverse weather conditions, particularly when a transparent armor composite is used in military applications.

The various layers used in the composite are chosen for their different projectile resisting characteristics and functions. For example, glass layers are hard and thus readily erode bullets and are highly abrasion resistant. However, glass layers are brittle which causes any glass layers opposite a penetration threat to spall, which in turn creates shrapnel fragments. The shrapnel creates numerous projectiles upon the interior surface of the vehicle and the resulting spall or fragments can be more dangerous than the original penetrator. Plastic material layers used as part of a composite sandwich provide a means to introduce flexibility into the transparent armor composite. The addition of one more plastic layers to the composite changes the failure mode of the transparent armor so it fails in a more ductile manner rather than spalling. Acrylic, polyurethane and polycarbonate based materials are among the polymeric materials which have been shown to have utility in making transparent armor composites.

One example of a transparent sheet composite useful as transparent armor is shown in U.S. Pat. No. 5,506,051. This particular patent discloses a laminated glass and polycarbonate construction with the addition of one or more transition layers of cured aliphatic urethane. The urethane provides a tension absorbing transmission layer within the composite. This patent also describes glasses and plastic materials useful in forming laminates that can be used as transparent armor.

One class of plastics that has proven both useful and reliable in constructing transparent armor composites and architectural bandit type barriers is polycarbonate. Polycarbonate has proved to have superior characteristics in terms of providing overall protection because it is the plastic with the highest spread between brittleness transition temperature and heat distortion temperature. This makes polycarbonates generally preferred materials in transparent armor composites. Unfortunately, polycarbonate and the other useful plastic materials useful in the practice of this invention are soft and easily abraded by the action of dirt and dust. Further, these materials are frequently adversely affected by solvents and cleaning solutions when used to remove dirt. Thus, if plastics are used as the inner layer of a transparent armor composite, cleaning the surface dirt and grime will inevitably cause scratching. This causes the optical properties to be adversely effected. The scratching can cause the transparency of the transparent armor composite to substantially degrade in under one year. The substantial degradation of transparency necessitates replacement of the composite. Since the transparent armor composites are expensive, frequent replacement creates a substantial financial burden on maintenance budgets.

It appeared the only alternative to a degrading composite was to have an innermost glass layer. This carries an increased spalling risk. The transparent armor assembly of the present invention provides a system with separate, parallel elements combined in a basic structure. The first element is a transparent armored composite that can defeat a penetrator and has an outer layer which withstands the abrasion of the ambient environment outside the vehicle. The second element is located between the first element and the vehicle's interior, removed from the first element so that the shock of the penetrator is absorbed by the first element and is not transmitted to the second element. This structure allows the use of a sacrificial inner element which permits cleaning without degradation of the expensive portion of the structure while providing a good spall retaining to inner layer. As an added advantage, the second element of this invention is easily changed so we can easily switch from a heat limiting sun screen to a clear screen compatible with night vision devices. This allows enhanced daytime operation without adversely affecting nighttime operation

SUMMARY OF THE INVENTION

Briefly the present invention is an improved transparent armor structure for use in protecting an opening in a vehicle. The armor structure includes a multipart C-shaped frame mounted to a vehicle, the frame surrounding the opening. The frame is adapted to firmly hold a sheet of laminated transparent armor composite. The laminated armor composite has inner and outer layers of tempered silica glass material. The laminated armor composite has at least one layer of a polymeric material, such as polycarbonate, integrally bonded with the layers of tempered silica glass. The laminated armor composites useful in practicing this invention will comprise at least three layers integrally bonded to form a laminated bullet resisting structure. The bonding adhesives and other consolidating materials are chosen so that the composite is optically clear and non-yellowing. Of course, the laminated armor composite can be more than three lamellas thick. In constructing the laminated armor composite the various lamella are chosen from among assorted transparent materials chosen for their unique projectile resistance and flexibility characteristics.

The C-shaped frame that encloses the transparent armor composite is attached to the vehicle and extends into the vehicle interior. The C-shaped frame supports the transparent armor composite and associated parts of the structure in place. A y-shaped member is attached to the C-shaped frame, the y-shaped member being adapted to hold a free-standing transparent spall resisting layer parallel to and spaced from the innermost surface of the transparent armor composite. The y-shaped member is positioned on the inside of the vehicle and attached to the C-shaped frame in a manner to allow easily removal and replacement of the spall layer.

The spall layer can be formed from a transparent material generally chosen from the types of material used in the transparent armor composite. While the spall layer can be scratched, or otherwise adversely affected by cleaning solvents and abrasives, it can be easily and inexpensively replaced. The separation between the spall resistant layer and the transparent armor composite protects the spall resistant layer from shock waves induced in the transparent armor by penetrators. Also, having the spall resistant layer separately mounted and easily changed allows the spall resistant layer to have a sunshade or other optical coating suitable for daytime operation while allowing the spall resistant layer to be easily changed for nighttime operation.

A spacing means is located between the transparent armor composite and the spall resisting layer along their edges to form a chamber. The chamber contains a desiccant to minimize or eliminate the amount of moisture within the chamber so as to control any condensation, which would create an impediment to vision.

BRIEF DESCRIPTION OF THE DRAWING

In the accompanying drawing:

The FIGURE is a partial side view in section of one embodiment of this invention.

DETAILED DESCRIPTION

Referring to the accompanying drawing, an improved transparent armor structure according to this invention is designated generally as 10. A transparent laminated armor composite 12 is shown with a plurality of lamella. Tempered silica glass lamella 14, 16 form the innermost and outermost layers of the composite. The tempered silica glass provides ballistic strength and abrasion resistance to the transparent armor. Silica glass is also highly resistant to common chemicals which can attack and degrade the transparency of the armor composite if plastic layers are exposed to the chemicals. Using silica glass as the outer layers allows the present transparent armor composite 12 to be cleaned using solvents or abrasive cleaners without substantial degradation of optical properties. The glass lamella 14, 16 each have a layer of plastic material 18, 20 laminated to their inner surfaces. As shown and as is common in transparent laminated armor composites 12 there are additional inner layers of material 22, 24 and a central layer 26. These inner layers will generally be additional layers of tempered glass and energy absorbing layers of plastic material or similar strengthening materials designed to absorb shock and provide the composite with additional penetration resistance. The particular materials chosen for the inner layers 22, 24, and 26 will be chosen based on the particular threat expected. The materials useable for inner layers 22, 24 and 26 are generally known in the transparent armor art and the material of choice and thickness will be dictated by threat protection, weight allowance, optical properties, manufacturing considerations and cost considerations. The innermost 14 and outer most layer 16 used in the present transparent laminated armor 12 are tempered silica glass since that is the material which provides the greatest resistance to scratching and chipping and thus is the most desirable material on the outermost surfaces of the transparent laminated armor 12 composite to preserve and maintain optical integrity. The choice of particular materials for each individual lamella within the transparent laminated armor composite 12 is within the skill of the art and further description is omitted in the interest of brevity.

The transparent laminated armor 12 is mounted in a multi-part C-shaped frame 30 attached to a vehicle, not shown. The multiplied-part C-shaped frame 30 surrounds and encloses the edge of the transparent laminated armor composite's 12. The multi-part C-shaped frame 30 is formed to securely mount the transparent laminated armor composite 12 in position over an opening in the vehicle normally a vehicle window or windshield. In the multi-part C-shaped frame 30 shown, a first leg 32 forms one side of the C-shape of the frame and extends vertically beyond the frame's lower boundary so as to provide a flange 34. Flange 34 has a first plurality of apertures 35 that allow the flange to be attached to the vehicle's frame 36 surrounding the opening to be protected.

The flange 34 is secured to the vehicle frame 36 using a first plurality of threaded fasteners 38 passing through the first plurality of apertures 35. The threaded fasteners 38 are disposed at intervals around the periphery of the vehicle opening to provide proper support about circumference of the opening. The first vertical leg 32 of frame 30 is attached to a horizontal member 40 extending orthogonally from the first vertical leg into the vehicle's interior. As shown, first vertical leg 32 is firmly secured to horizontal member 40 by a second plurality of threaded fasteners 42 passing apertures 43 in the first vertical leg 32 and engaging a mating threaded aperture in the horizontal member. At the opposite and of the horizontal member 40, distal the first vertical leg 32 is a second vertical leg 44. The second vertical leg 44 is held in place on the horizontal member by a third plurality of threaded fasteners 46 passing through the second vertical leg 44 and engaging complementary threaded apertures in the horizontal member 40. The resulting C-shaped frame structure 30 surrounds and holds the transparent laminated armor composite 12 in position and allows it to be secured about the periphery of the vehicle opening so as to cover the opening and protect the vehicle's interior.

As noted before, silica glass while having good strength and abrasion resistance is brittle and the shock wave set up in transparent armor by the incursion of a projectile will cause fracture and spalling. This may happen when the edges of the transparent laminated armor 12 are exposed to chipping and stressing even absent projectile incursion. Therefore, to protect the transparent laminated armor 12 edge and provide a seal, a shaped polymeric gasket 48 is disposed between the transparent laminated armor composite 12 and the C-shaped frame 30. The gasket 48 can be formed of various natural or synthetic polymeric sealing materials that will serve to seal the transparent laminated armor composite 12 image.

Because the transparent laminated armor composite 12 of this invention has silica glass layers as the innermost and outermost lamella 14, 16 to provide abrasion resistance, any spall over fragments created by the shock wave of a projectile incursion, must be retained. The, the structure of this invention provides full protection by means of a y-shaped bracket designated generally 50, which holds a transparent spall resisting pane 52 parallel to and slightly spaced from the inner lamella 16 of the transparent laminated armor composite 12, the spall resisting pane being positioned on the inside face of the transparent laminated armor when mounted on the vehicle. The y-shaped bracket 50 and spall resisting pane 52 operate is a unit which allows easy removal and replacement of the spall resisting plate. The y-shaped bracket 50 is attached to the C-shaped bracket 30 using the third set of threaded fasteners 46 which allows easy removal of the spall resisting pane 52. Removal makes it easy to clean the inner surface of the transparent laminated armor composite 12 as needed. When it is necessary to replace the spall resisting pane 52 due to scratching or discoloration, a new pane can be substituted at cleaning. The spall resisting pane 52 can be formed from the same types of plastic materials as the flexible ballistic layers in the transparent laminated armor composite 12, for example, polycarbonate or acrylic materials. Thus even if the spall pane 52 is subject to scratching, and can be adversely effected by cleaning with solvents and abrasive cloths, once the spall pane 52 has deteriorated a new one is easily installed. The expense of changing a spall plate 52 is minimal as compared to replacing the entire composite 12 that is many times more expensive just in material costs.

Placing the spall resisting pane 52 spaced from the transparent armor composite 12 protects the spall resistant pane 52 from the shock wave generated by the incursion of the penetrator. Because the spall resistant pane 52 is not subject to the shock wave it can also be made of tempered glass. The ease of replacement also allows a sunscreen glass or plastic to be used as the spall resistant plate 52 on sunny days and replaced with a transparent sheet at night or on overcast days.

The second vertical leg 44 of C-shaped bracket 30 acts as a spacer between the composite 12 and the spall pane 52 forming a chamber 54 which protects the spall resistant plate 52 from shock waves and collects spall. The chamber 54 has a desiccant 56 disposed within the chamber, the desiccant serving to minimize or eliminate the moisture within the chamber to control the condensation. Condensation on surfaces will interfere with vision and results in safety problems. The easy removal ability of the y-shaped bracket, spall resistant pane 52 unit will allow the desiccant 56 to be rapidly replaced when it becomes saturated.

Various alterations and modifications will become apparent to those skilled in the art without departing from the scope and spirit of this invention and it is understood this invention is limited only by the following claims.

What is claimed is:

1. An improved transparent armor structure for use in protecting an opening in a vehicle the armor including: a multi pieced C-shaped frame mounted to a vehicle and extending into the interior of the vehicle, the frame surrounding the opening; a sheet of laminated transparent armor composite comprising a plurality of lamella at least one of said lamella being formed from a polymeric material, an innermost and outermost lamella each being formed of tempered silica glass, all of the lamella of said sheet of laminated transparent armor being bonded to form a coherent laminated bullet resisting structure, said laminated transparent armor composite being surrounded by said frame to hold said laminated transparent armor in position over said opening; a y-shaped bracket attached to the C-shaped bracket in the interior of the vehicle by means of a plurality of fasteners, the y-shaped member adapted to hold a transparent spall resisting layer parallel to and slightly spaced from the inner surface of the laminated transparent armor, to form a chamber between the first and second panels; and a desiccant located within the chamber the desiccant serving to minimize the amount of condensation in the space between the laminated transparent armor and the surface of the transparent armor and the transparent spall resisting layer.

2. The transparent armor structure of claim 1 where said C-shaped bracket comprises a first vertically extending leg attached to the vehicle about the opening, a horizontal member extending orthogonally into the vehicle from the first vertically extending leg and a second vertical leg attached to the horizontal member at the end distal the first vertical leg.

3. The transparent armor structure of claim 1 where the transparent spall resisting layer has a tint for limiting light transmission.

4. The transparent armor of claim 1 where the transparent spall layer is polycarbonate.

5. The transparent armor structure of claim 1 wherein the c-shaped multi-pieced frame has a C-shaped polymeric material located between the C-shaped frame and the transparent armor.

6. The transparent armor of claim 1 where the transparent spall layer is tempered glass.

* * * * *